United States Patent
Chang et al.

(10) Patent No.: US 12,303,348 B2
(45) Date of Patent: May 20, 2025

(54) GENERATING A 3D TOOTH MODELING FILE ADJUSTED FOR TOOTH SIZE FOR MANUFACTURING A 3D DENTAL LAMINATE

(71) Applicant: e32 Technology Inc., Chantilly, VA (US)

(72) Inventors: Young Cheol Chang, Chantilly, VA (US); Yong Min Park, Chantilly, VA (US); Junhyuk Yoon, Seoul (KR)

(73) Assignee: e32 Technology Inc., Chantilly, VA (US)

( * ) Notice: Subject to any disclaimer, the term of this patent is extended or adjusted under 35 U.S.C. 154(b) by 360 days.

(21) Appl. No.: 18/109,712

(22) Filed: Feb. 14, 2023

(65) Prior Publication Data

US 2024/0268928 A1 Aug. 15, 2024

(51) Int. Cl.
*A61C 7/00* (2006.01)
*G06T 7/55* (2017.01)
*G06T 7/70* (2017.01)

(52) U.S. Cl.
CPC .............. *A61C 7/002* (2013.01); *G06T 7/55* (2017.01); *G06T 7/70* (2017.01);
(Continued)

(58) Field of Classification Search
CPC ........... G06T 7/55; G06T 7/564; G06T 7/571; G06T 7/593; G06T 7/596;
(Continued)

(56) References Cited

U.S. PATENT DOCUMENTS 10,507,087 B2 * 12/2019 Elbaz .................. A61B 1/0638
11,013,581 B2 * 5/2021 Sabina ............ A61B 1/000094
(Continued)

FOREIGN PATENT DOCUMENTS

WO WO-2024078361 A1 * 4/2024

OTHER PUBLICATIONS

Ma, Tian, Yurong Li, and Zhanli Li. "A survey of three-dimensional reconstruction methods for tooth models." 2018 IEEE International Conference on Signal Processing, Communications and Computing (ICSPCC), IEEE (Year: 2018).*
(Continued)

*Primary Examiner* — Scott A Rogers
(74) *Attorney, Agent, or Firm* — KED & ASSOCIATES, LLP

(57) ABSTRACT

A system for manufacturing a three-dimensional dental laminate according to the present invention includes at least one processor and a memory. The memory stores instructions causing the at least one processor to perform, in response to execution of the instructions, receiving images including a user's teeth, estimating poses of a camera by analyzing the received images, computing sparse 3D points by tracking feature points in the received images and triangulating a three-dimensional position of the feature points based on relative movements among the estimated poses of the camera, generating a three-dimensional tooth modeling file based on the sparse 3D points and adjusting for the size of an actual tooth, generating a three-dimensional dental laminate modeling file based on the adjusted three-dimensional tooth modeling file, and manufacturing a three-dimensional dental laminate based on the generated three-dimensional dental laminate modeling file.

20 Claims, 10 Drawing Sheets

(52) U.S. Cl.
CPC ............... *G06T 2207/10028* (2013.01); *G06T 2207/20081* (2013.01); *G06T 2207/30244* (2013.01)

(58) Field of Classification Search
CPC ....... G06T 7/70–77; G06T 2207/10028; G06T 2207/20081; G06T 2207/30244; A61C 7/002

See application file for complete search history.

(56) References Cited

U.S. PATENT DOCUMENTS

| | | | |
|---|---|---|---|
| 11,544,861 B2* | 1/2023 | Lancelle | G06V 40/165 |
| 12,076,205 B2* | 9/2024 | Amelon | G06T 7/30 |
| 2023/0149135 A1* | 5/2023 | Lipnik | A61C 9/0053 |
| | | | 433/214 |
| 2025/0076845 A1* | 3/2025 | Chang | G05B 19/4099 |

OTHER PUBLICATIONS

Xie, Jiaming, et al. "Tooth Motion Monitoring in Orthodontic Treatment by Mobile Device-based Multi-view Stereo." IEEE Transactions on Visualization and Computer Graphics (Year: 2024).*

* cited by examiner

【FIG. 1】
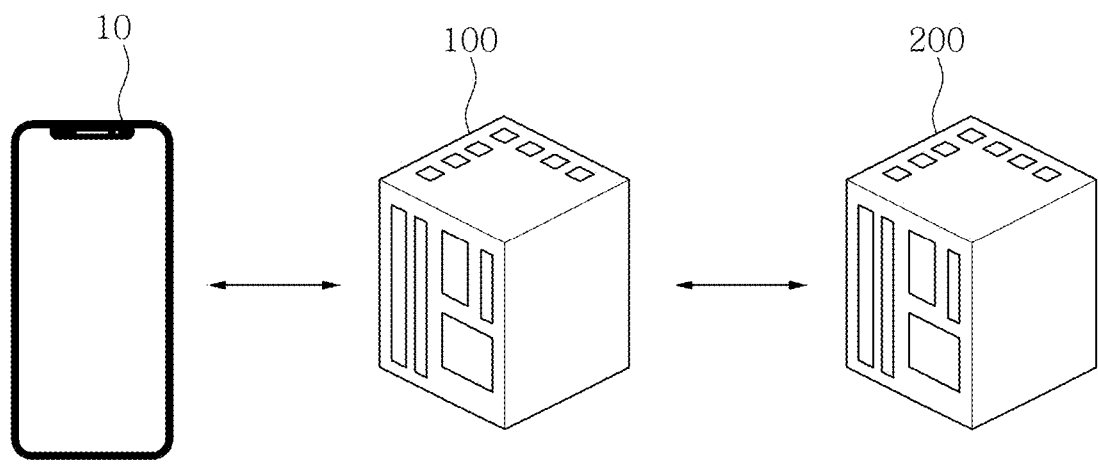
【FIG. 2】
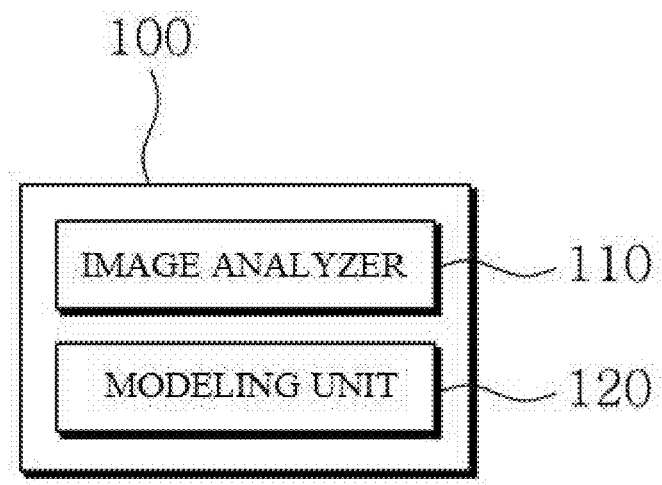

[FIG. 3]
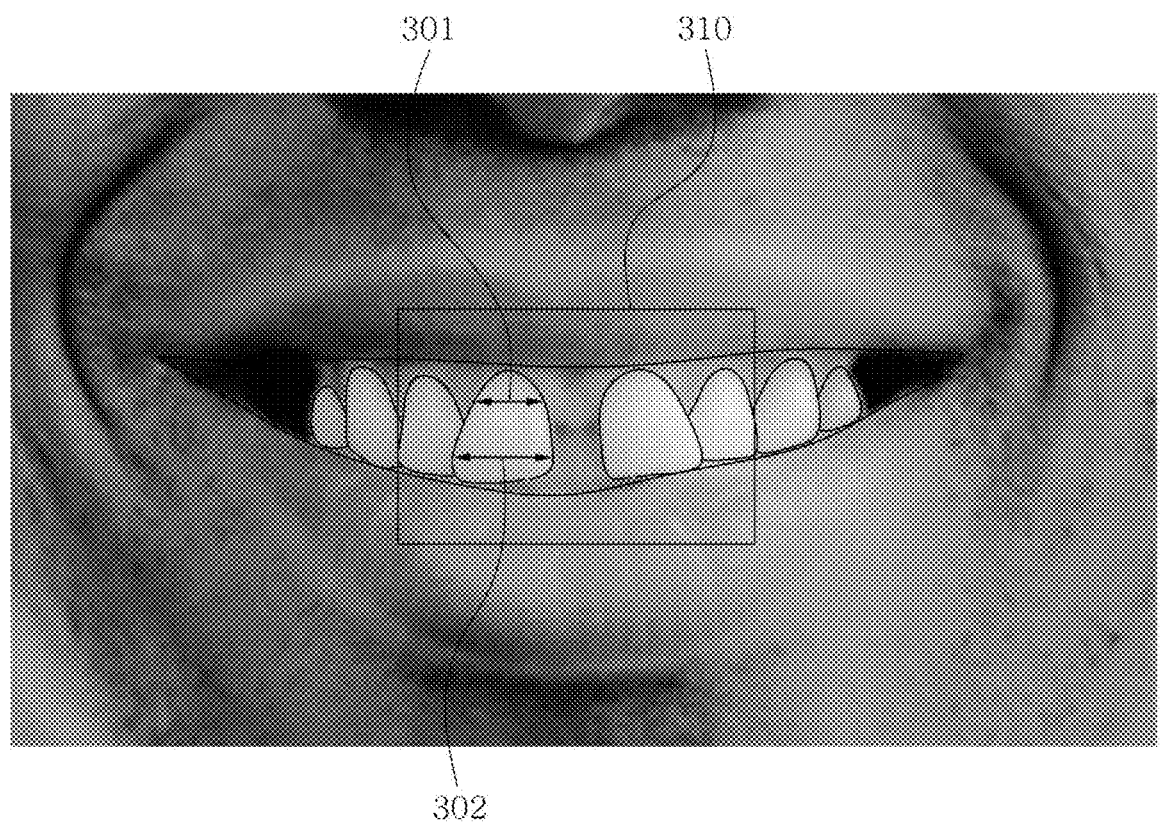

[FIG. 4]
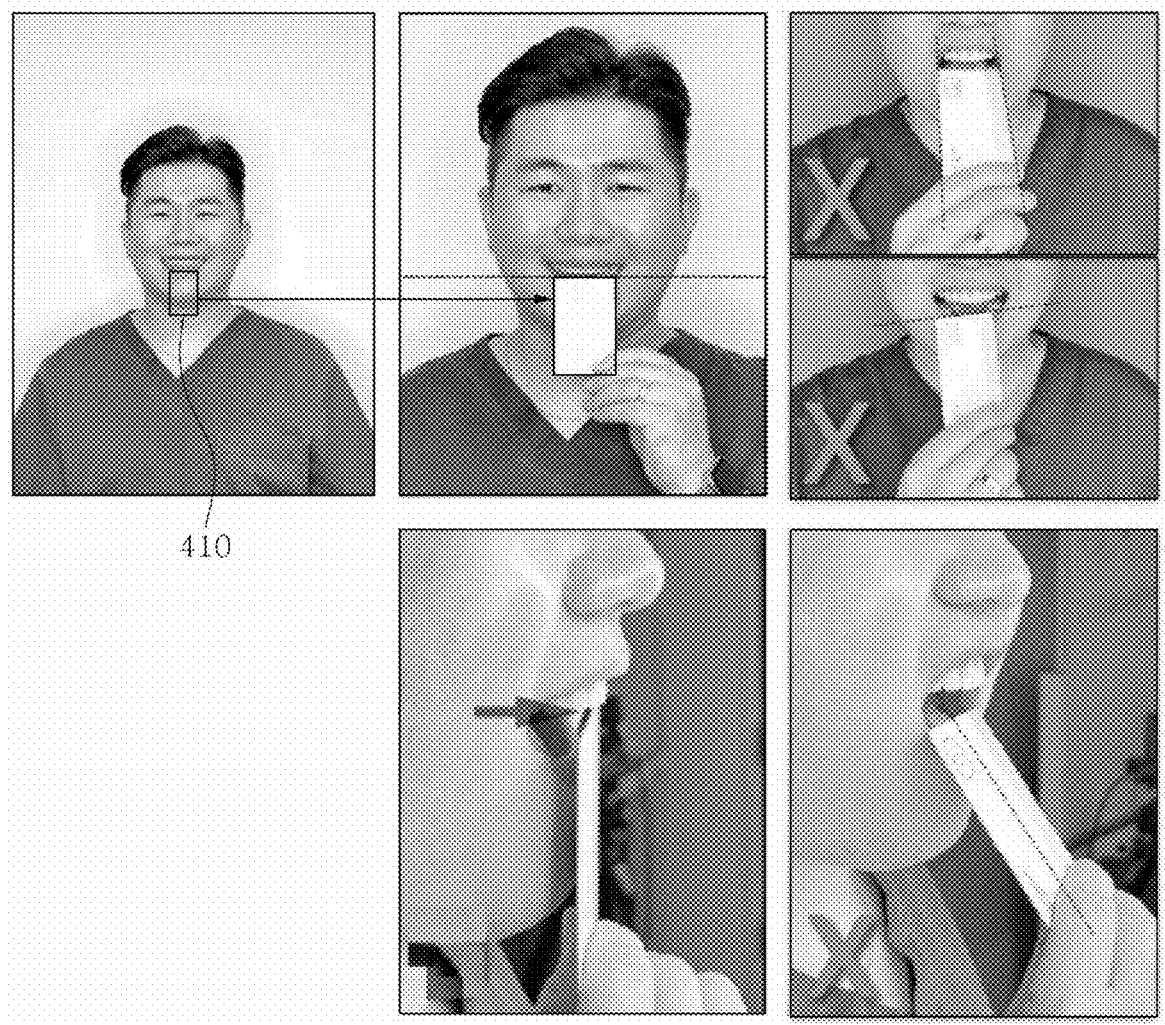

[FIG. 5A]
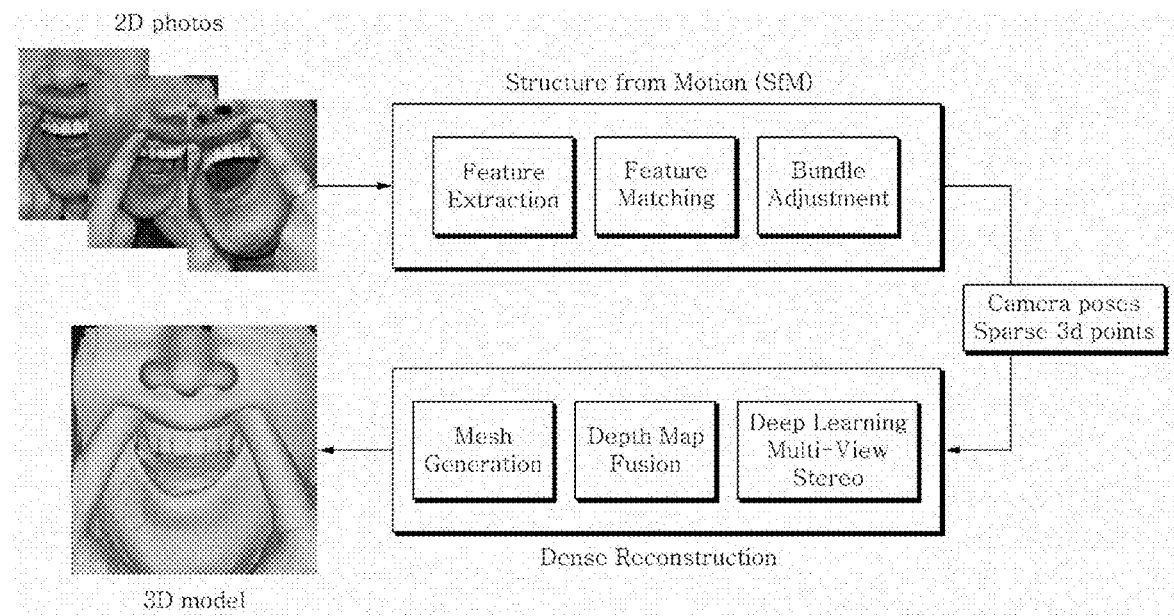
[FIG. 5B]
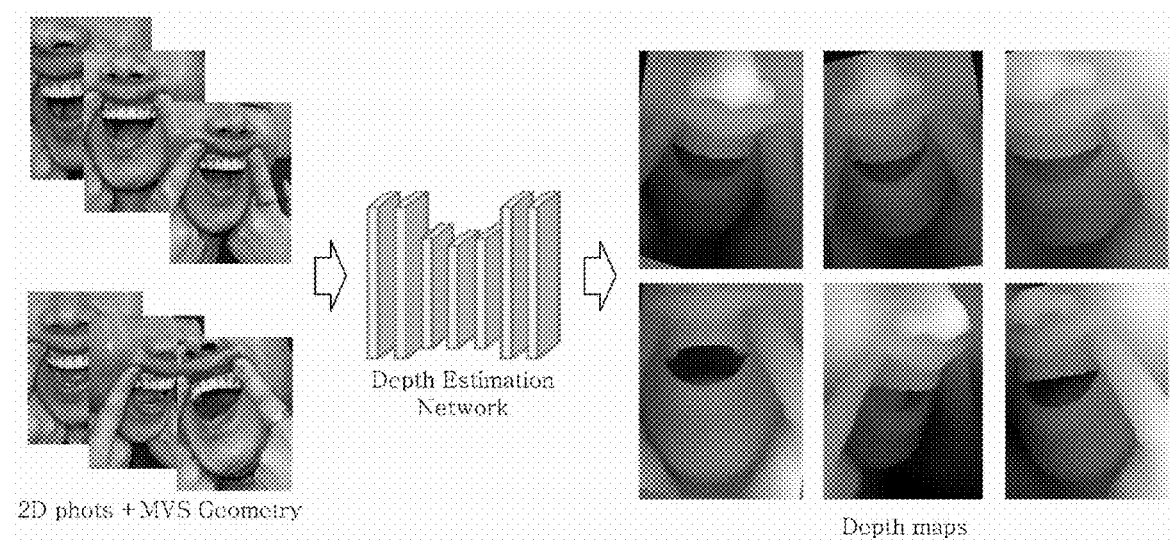

[FIG. 5C]
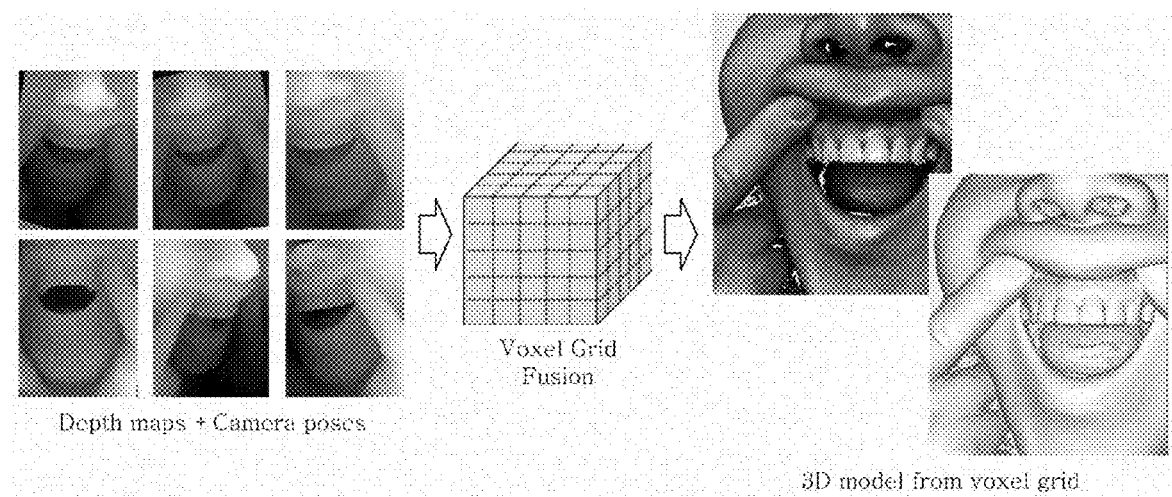

[FIG. 6]
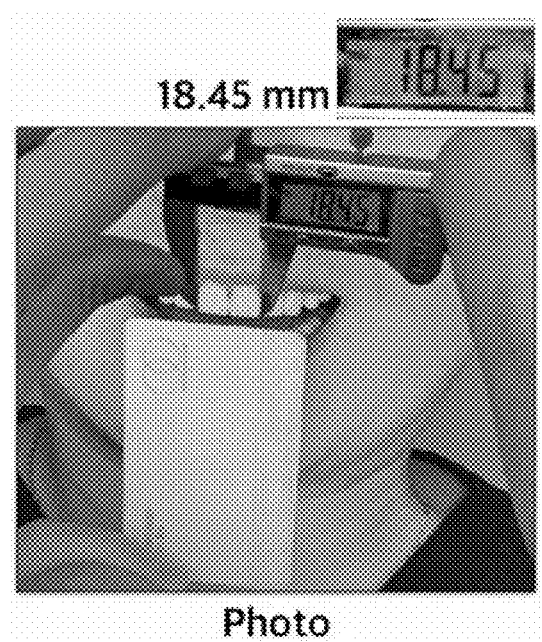
Photo
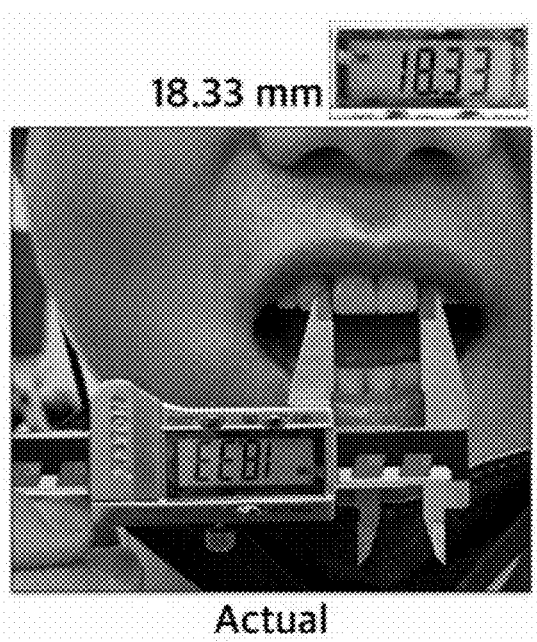
Actual

[FIG. 7]
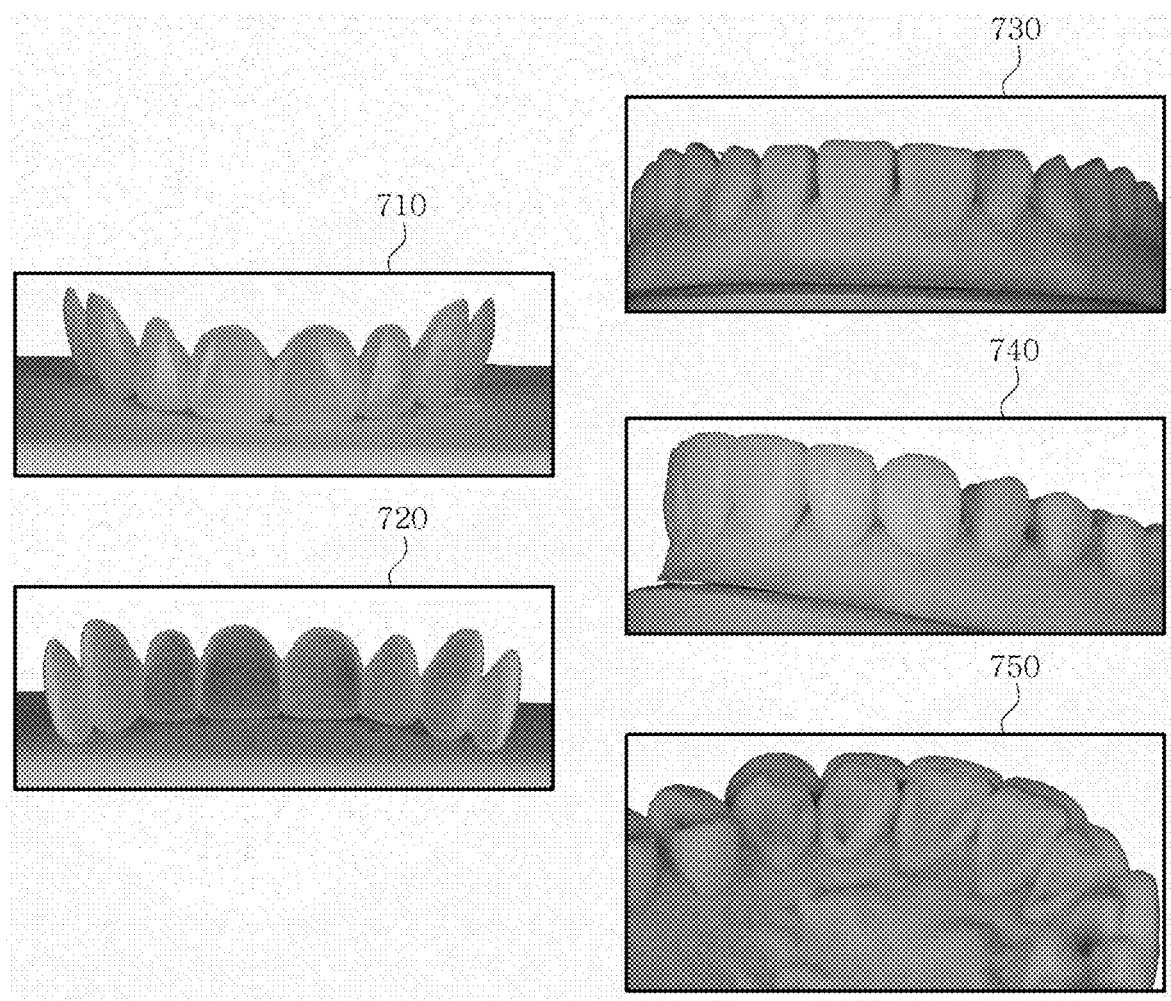

[FIG. 8]
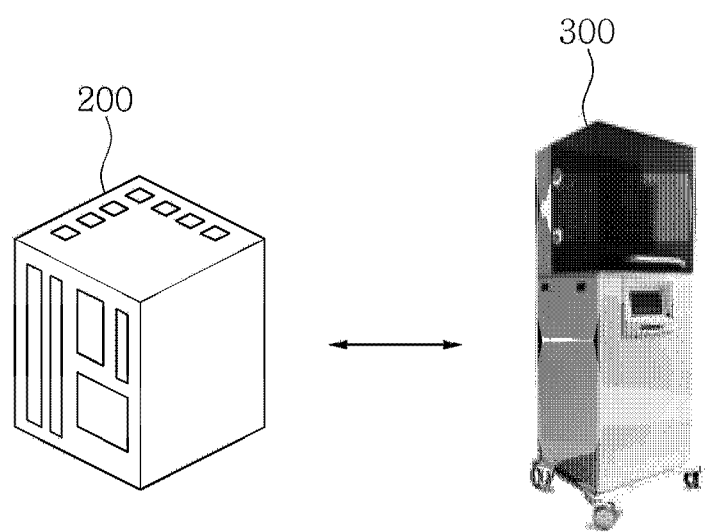

[FIG. 9]
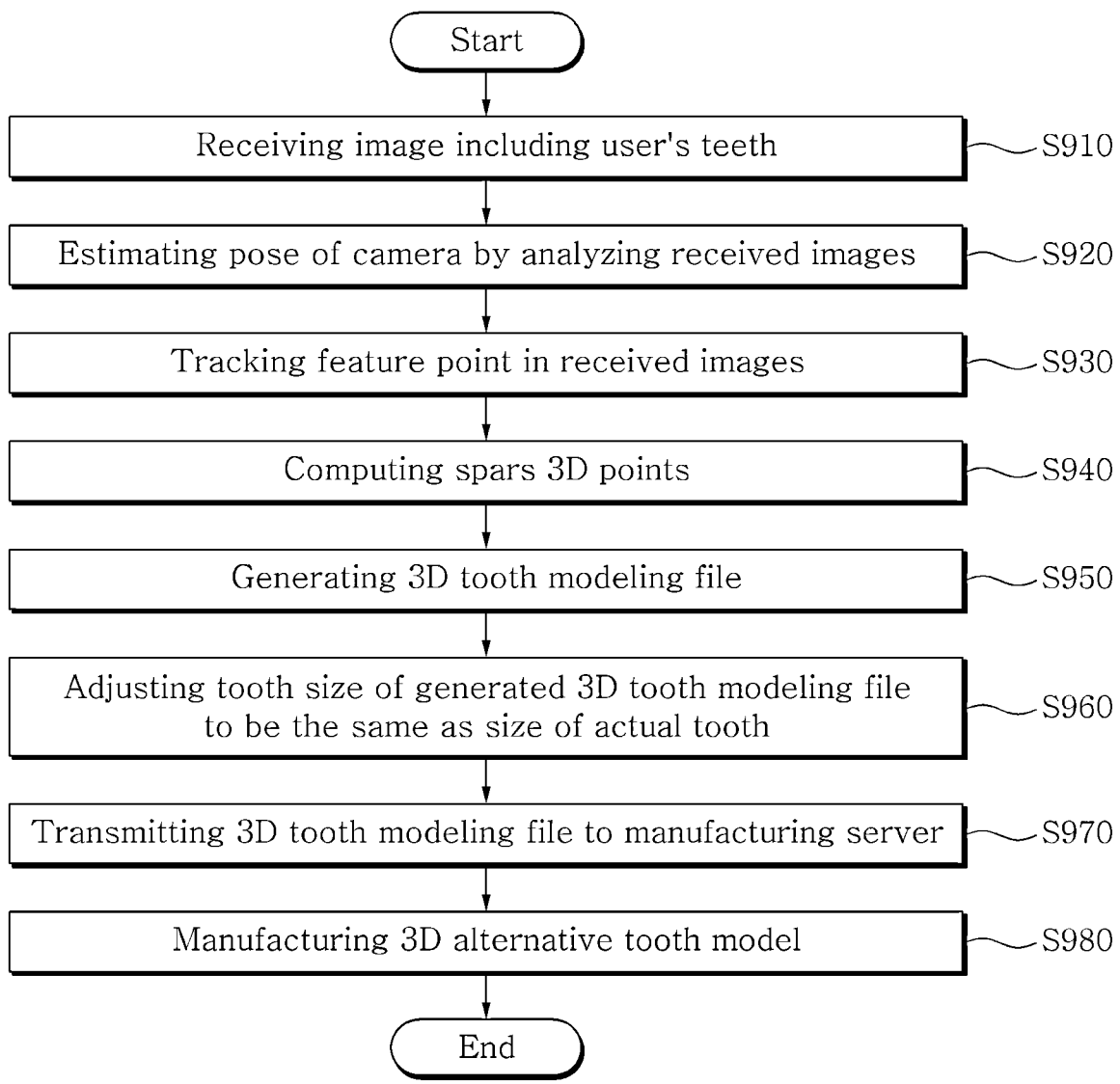

[FIG. 10]
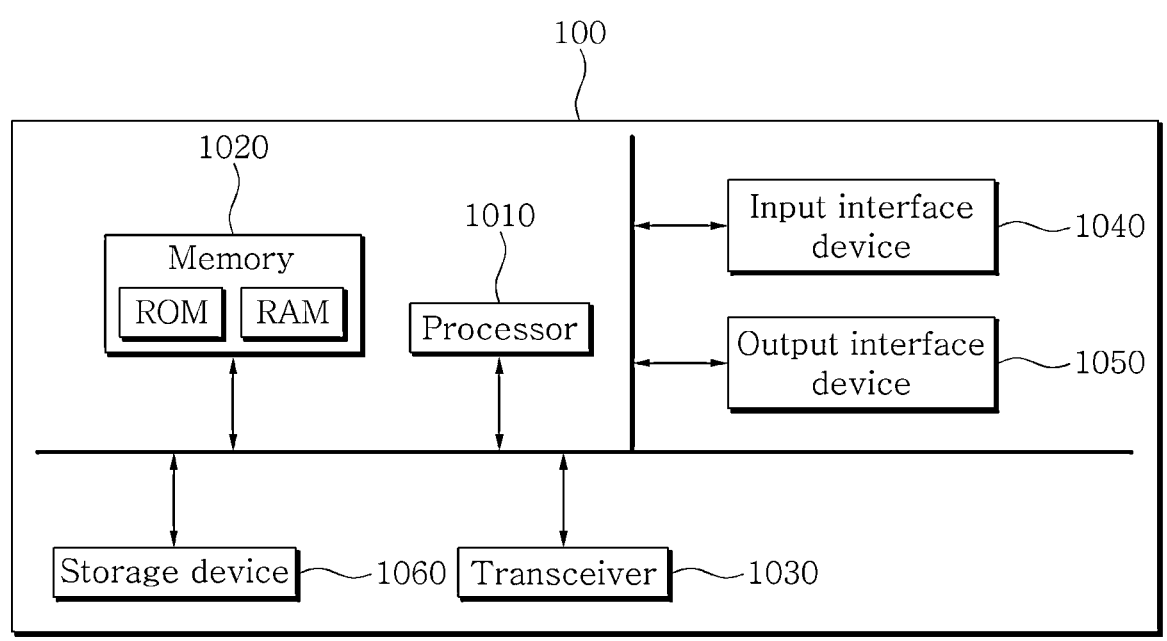

GENERATING A 3D TOOTH MODELING FILE ADJUSTED FOR TOOTH SIZE FOR MANUFACTURING A 3D DENTAL LAMINATE

TECHNICAL FIELD

The present disclosure relates to a system, method, program, and computer-readable recording medium for manufacturing three-dimensional dental laminate using image information.

BACKGROUND ART

Unless otherwise indicated herein, content described in this section is not prior art to the claims in this application, and inclusion thereof in this section is not an admission that the content is prior art.

The external form of teeth, such as alignment, color and state of preservation, has a great influence on aesthetics. Among dental treatments for correcting the external form, orthodontics, implant insertion, and laminate-based treatment are used for cosmetic or functional purposes.

Orthodontics requires use of orthodontic appliances for a long period of time, and periodic dental care, causing a lot of inconvenience to people treated with orthodontics. In addition, orthodontics requires periodic care even after the correction is completed. If the care is stopped, a person treated with orthodontics may suffer from the same problem with his or her teeth. Further, excessive correction has a risk of causing overload to the temporomandibular joint and gums.

In addition, implant insertion, which is a treatment method widely applied for cosmetic and functional purposes, involves many restrictions according to the patient's gums, jawbone, teeth and oral structure and the cost thereof is high.

In the case of laminate-based treatment, which is a dental procedure in which a part of a tooth is removed and then a ceramic member is attached with a resin adhesive, is widely known to be adopted for cosmetic purposes. However, an irreversible procedure involving removal of a part of the tooth is essential. In general, a ceramic member is attached after tooth enamel is removed. In this process, the enamel may be excessively removed, or strong stimulation may result in cold teeth. Further, malocclusion may occur due to inaccurate modeling, or dental caries and gum inflammation may occur in the gap between the laminate and the actual tooth after a laminate is attached.

Teeth have a great influence on the formation of an oral structure and also have a great impact on aesthetics in relation to interpersonal relationships. It takes a long time, high cost and follow-up care for a damaged tooth to recover. In addition, precise measurement and processing are required to accurately establish alignment (occlusion) with existing teeth and to make teeth straight. To this end, conventionally, the customer is required to visit the dentist to take a tooth pattern or precisely measure the alignment of the existing teeth and the size of each tooth through 3D scanning.

Therefore, there is a need for a system for manufacturing a three-dimensional dental laminate that may be used for cosmetic purposes in everyday life by producing a dental laminate with a level of precision similar to that of the conventional technology simply based on image information obtained by taking photos and/or videos of the user's teeth using a mobile phone or the like through an accurate and quick procedure without separate dental treatment.

DISCLOSURE

Technical Problem

Therefore, the present disclosure has been made in view of the above problems, and it is one object of the present disclosure to provide a three-dimensional dental laminate manufacturing system, method, program, and computer-readable recording medium for generating a 3D dental laminate matched to actual teeth based on image information.

Technical Solution

In accordance with one aspect of the present disclosure, provided is a system for manufacturing a three-dimensional dental laminate.

The three-dimensional dental laminate manufacturing system may include at least one processor, and a memory operably coupled to the at least one processor. The memory may store instructions that cause the at least one processor to perform at least one operation in response to execution of the instructions by the at least one processor. The at least one operation may include receiving images including a user's teeth, estimating poses of a camera by analyzing the received images, computing sparse 3D points by tracking feature points in the received images and triangulating a three-dimensional position of the feature points based on relative movements among the estimated poses of the camera, generating a three-dimensional tooth modeling file based on the sparse 3D points and adjusting a tooth size of the generated three-dimensional tooth modeling file for a size of an actual tooth, generating a three-dimensional dental laminate modeling file based on the three-dimensional tooth modeling file adjusted for the actual tooth, and manufacturing a three-dimensional dental laminate based on the generated three-dimensional dental laminate modeling file.

The operation may further include detecting a condition of the teeth by detecting the teeth and the mouth shape included in the received images using an object detection algorithm.

In addition, the operation may further include determining whether a region of interest including a tooth necessary for manufacturing a three-dimensional dental laminate is present in the received images, and determining whether the received images are suitable for three-dimensional tooth modeling based on a contour and area of the tooth included in the region of interest and a contour and area of the mouth shape.

In addition, the operation may further include, when an upper width of the tooth included in the region of interest is less than a lower width thereof, determining that the tooth to be modeled is an upper tooth, and when the upper width of the tooth included in the region of interest is greater than the lower width, determining that the tooth to be modeled is a lower tooth.

The estimating of the poses of the camera may include estimating the poses of the camera capturing the received images through a Structure from Motion (SfM) process. The generating of the three-dimensional tooth modeling file may include generating a stereo pair by pairing the poses of the camera estimated through the SfM process, and generating a depth map for each of the images corresponding to the stereo pair using deep learning-based stereo depth map estimation.

In addition, the images may further include a predetermined size control object, wherein the adjusting of the tooth size of the generated three-dimensional tooth modeling file for the size of the actual tooth may include comparing an actual size of the predetermined size control object with the size of the predetermined size control object included in the images and adjusting an actual size of the three-dimensional tooth modeling file.

In addition, the generating of the three-dimensional dental laminate modeling file may include generating the three-dimensional dental laminate modeling file such that an outer shape of the three-dimensional tooth modeling file adjusted for the size of the actual tooth is formed into an inner side of the dental laminate modeling file in intaglio, and an outer side of the dental laminate modeling file has a normal tooth shape and tooth alignment shape.

In addition, the three-dimensional dental laminate modeling file may include a one piece model structure connecting all individual tooth.

In this case, the three-dimensional dental laminate modeling file may be modeled in a form of embossed or engraved user information on one side of an interior or exterior of the three-dimensional dental laminate.

In accordance with another aspect of the present disclosure, provided is a method for manufacturing a three-dimensional dental laminate by a system. The method may include receiving images including a user's teeth, estimating poses of a camera by analyzing the received images, computing sparse 3D points by tracking feature points in the received images and triangulating a three-dimensional position of the feature points based on relative movements among the estimated poses of the camera, generating a three-dimensional tooth modeling file based on the sparse 3D points, adjusting the size of the tooth of the generated three-dimensional tooth modeling file for the size of an actual tooth, generating a three-dimensional dental laminate modeling file based on the three-dimensional tooth modeling file adjusted for the actual tooth, and manufacturing a three-dimensional dental laminate based on the generated three-dimensional dental laminate modeling file.

The method may further include detecting a condition of the teeth by detecting the teeth and a mouth shape included in the received images using an object detection algorithm.

In this case, the method may further include determining whether a region of interest including a tooth necessary for manufacturing a three-dimensional dental laminate is present in the received images, and determining whether the received images are suitable for three-dimensional tooth modeling based on a contour and area of the tooth included in the region of interest and a contour and area of the mouth shape.

The method may further include, when an upper width of the tooth included in the region of interest is less than a lower width thereof, determining that the tooth to be modeled is an upper tooth, and when the upper width of the tooth included in the region of interest is greater than the lower width, determining that the tooth to be modeled is a lower tooth.

The estimating of the poses of the camera may include estimating the poses of the camera capturing the received image through a Structure from Motion (SfM) process. The generating of the three-dimensional tooth modeling file may include generating a stereo pair by pairing the poses of the camera estimated through the SfM process, and generating a depth map for each of the images corresponding to the stereo pair using deep learning-based stereo depth map estimation.

In this case, the images may further include a predetermined size control object, wherein the adjusting of the tooth size of the generated three-dimensional tooth modeling file for the size of the actual tooth may include comparing an actual size of the predetermined size control object with a size of the predetermined size control object included in the images and adjusting an actual size of the three-dimensional tooth modeling file.

The manufacturing of the three-dimensional dental laminate may include transmitting the generated three-dimensional dental laminate modeling file to a manufacturing server, and outputting the three-dimensional dental laminate using a 3D printer connected to the manufacturing server over a wired or wireless network.

In addition, the generating of the three-dimensional dental laminate modeling file may include generating the three-dimensional dental laminate modeling file such that an outer shape of the three-dimensional tooth modeling file adjusted for the size of the actual tooth is formed into an inner side of the dental laminate modeling file in intaglio, and an outer side of the dental laminate modeling file has a normal tooth shape and tooth alignment shape.

The generating of the three-dimensional dental laminate modeling file may include a one piece model structure connecting all individual tooth.

In this case, the generating of the three-dimensional dental laminate modeling file may include modeling in a form of embossed or engraved user information on one side of an interior or exterior of the three-dimensional dental laminate.

In accordance with another aspect of the present disclosure, provided is a computer-readable recording medium storing a computer program for executing the three-dimensional dental laminate manufacturing method when executed by a system including at least one processor.

Advantageous Effects

According to one embodiment of the present disclosure, a three-dimensional dental laminate matched to a user's teeth may be provided based on image information without irreversible loss of teeth.

According to one embodiment of the present disclosure, a three-dimensional dental laminate having a level of precision similar to that of the conventional technology may be manufactured based only on image information captured and provided by a user through a mobile phone or the like, even without separately consulting a dentist.

DESCRIPTION OF DRAWINGS

FIG. 1 is a schematic diagram illustrating a system for manufacturing a 3-dimensional dental laminate according to an embodiment of the present disclosure.

FIG. 2 is an exemplary diagram illustrating an apparatus for manufacturing a 3-dimensional dental laminate according to an embodiment of the present disclosure.

FIG. 3 is an exemplary view illustrating an example in which an image analyzer detects teeth in a received image.

FIG. 4 is an exemplary view illustrating a measurement guide with a predetermined size control object.

FIG. 5A is an exemplary view illustrating an example of generating a 3-dimensional tooth modeling file and a dental laminate modeling file based on a received tooth image.

FIG. 5B is an exemplary view illustrating an example of generating a 3-dimensional tooth modeling file and a dental laminate modeling file based on a received tooth image.

FIG. 5C is an exemplary view illustrating an example of generating a 3-dimensional tooth modeling file and a dental laminate modeling file based on a received tooth image.

FIG. 6 is an exemplary view illustrating an example of adjusting the scale of a generated 3-dimensional tooth modeling file.

FIG. 7 is an exemplary view illustrating a 3-dimensional tooth model and a 3-dimensional dental laminate.

FIG. 8 is an exemplary diagram illustrating an example in which a manufacturing server manufactures a 3-dimensional tooth model and/or a 3-dimensional dental laminate.

FIG. 9 is an exemplary flowchart illustrating a method for manufacturing a 3-dimensional dental laminate by a 3-dimensional dental laminate manufacturing system.

FIG. 10 is a diagram illustrating a hardware configuration of the apparatus according to FIG. 2.

DETAILED DESCRIPTION OF THE INVENTION

The following embodiments are combinations of components and features of the embodiments in a predetermined form. Each component or feature may be considered optional unless explicitly stated otherwise. Each component or feature may be implemented without being combined with other components or features. In addition, various embodiments may be configured by combining some components and/or features. The order of operations described in various embodiments may be changed. Some components or features of one embodiment may be included in another embodiment, or may be replaced with corresponding components or features of another embodiment.

In the description of the drawings, procedures or steps that may obscure the gist of various embodiments are not described, and procedures or steps that can be understood by those skilled in the art are not described.

Throughout the specification, when a part "includes" or "comprises" a component, the part may further include other components, and such other components are not excluded unless there is a particular description contrary thereto. Terms such as "unit," "-er," and "module," refer to units for processing at least one function or operation, which may be implemented by hardware, software, or a combination thereof. As used herein, articles "a or an," "one," "the," and the like are intended to include both the singular form and the plural form in the context of describing various embodiments (particularly in the context of the accompanying claims) unless otherwise indicated or clearly contradicted by context.

Hereinafter, embodiments according to various examples will be described in detail with reference to the accompanying drawings. The detailed description set forth below in conjunction with the accompanying drawings is intended to describe exemplary embodiments of various examples, and is not intended to present one and only one embodiment.

In addition, specific terms used in various embodiments are provided to facilitate understanding of various embodiments. These specific terms may be changed into other forms without departing from the spirit of various embodiments.

Hereinafter, a preferred embodiment according to the present disclosure will be described in detail with reference to the accompanying drawings.

FIG. 1 is a schematic diagram illustrating a system for manufacturing a 3-dimensional dental laminate according to an embodiment of the present disclosure.

Referring to FIG. 1, a 3D dental laminate manufacturing system may include a user terminal 10, a 3D dental laminate manufacturing apparatus 100 (hereinafter referred to as an "apparatus") and a manufacturing server 200 (hereinafter referred to as a "server")

Here, the user terminal 10, the apparatus 100, and the server 200 may be, for example, any one of a desktop computer, a laptop computer, a notebook, a smart phone, a tablet PC, a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, and a personal digital assistant (PDA), but is not limited thereto.

The apparatus 100 may receive an image including the user's teeth from the user terminal 10. Here, the image may include at least one of a 2-dimensional image, a 3-dimensional image, and a video. While it is assumed that the user terminal 10 is connected to the apparatus 100 separately for simplicity of description of the present disclosure, embodiments are not limited thereto. The user terminal 10 may include the function of apparatus 100.

Here, the tooth image may be a 2-dimensional image taken such that all teeth in a region for which the user intends to make a 3D dental laminate (which may be referred to as a "dental laminate") are included.

For example, a user who intends to manufacture a dental laminate to cosmetically cover a damaged or uneven front tooth may capture an image including at least a part of the mouth, front teeth, and upper gums using the user terminal 10, and the apparatus 100 may receive the captured image from the user terminal 10.

In addition, the 3D image and video may include a calculated round trip time and phase difference of emitted light including infrared rays or short-wavelength lasers, or depth information about an object included in the image and video.

Upon receiving an image, the apparatus 100 may analyze and scale the received image to generate a 3D tooth modeling file and store the same in a database. For example, the apparatus 100 may analyze and scale up or down the received 2D or 3D image and video through a computer aided design (CAD) (e.g., AutoCAD, Exocad, and other dental CAD programs) to generate a 3D tooth modeling file for manufacturing a tooth model.

In addition, the apparatus 100 may generate a modeling file of a dental laminate to be coupled to the user's teeth based on the 3D tooth modeling file. The inside of the dental laminate manufactured therefrom may be matched to the user's actual teeth by engraving the outside of the 3D tooth model that may be generated from the 3D tooth modeling file. In addition, the outside of the three-dimensional dental laminate may not damage the shape of the teeth and may be formed in the shape of better aligned teeth. Accordingly, it may be used as a cosmetic dental structure.

Similarly, the apparatus 100 may analyze and scale up or down the received 2D or 3D image and video through a computer aided design (CAD) (e.g., AutoCAD, Exocad, and other dental CAD programs) to generate a 3D dental modeling file for manufacturing a tooth model.

After the 3D tooth modeling file and/or the 3D dental laminate modeling file is generated, the apparatus 100 may transmit the 3D tooth modeling file and/or the 3D dental laminate modeling file to the server 200 to create a 3D tooth model and/or a 3D dental laminate based on the generated 3D tooth modeling file and/or the 3D dental laminate modeling file.

The server 200 may be connected to the apparatus 100 over a wired/wireless network to receive the 3D tooth modeling file and/or the 3D dental laminate modeling file. It may manufacture a tooth model and/or a dental laminate based on the received 3D tooth modeling file and/or 3D dental laminate modeling file.

For example, the server 200 may manufacture a tooth model and/or dental laminate using a 3D printer (e.g., Carbon 3D Printer by Google or Asiga 3D Printer) connected to the server over a wired/wireless network.

While it is assumed that the server 200 is connected to the 3D printer separately in manufacturing a 3D tooth model or dental laminate for simplicity of description of the present disclosure, embodiments are not limited thereto. The apparatus 100 may include the function of the server 200 and may communicate directly with the 3D printer.

FIG. 2 is an exemplary diagram illustrating an apparatus for manufacturing a 3-dimensional dental laminate according to an embodiment of the present disclosure.

Referring to FIG. 2, the apparatus 100 may include an image analyzer 110 and a modeling unit 120.

The image analyzer 110 may receive and analyze an image including the user's teeth from the user terminal 10. Here, the image may include at least one of 2-dimensional images, 3-dimensional images, and videos. The image may be a 3D image and a video including information about a calculated round trip time and phase difference of emitted light including infrared rays or short-wavelength lasers, or depth information about an object included in the image and the video.

For example, the image analyzer 110 may analyze the received image and determine whether information about the image is suitable for 3D tooth modeling. For example, the image analyzer 110 may divide or extract objects included in the received image into one or more objects through an object detection algorithm using contour detection or edge detection. For example, the image analyzer 110 may detect the teeth and mouth included in the received image using the object detection algorithm to determine the condition of the teeth including the alignment of teeth, the number of teeth, and damaged teeth.

FIG. 3 is an exemplary view illustrating an example in which an image analyzer detects teeth in a received image.

Referring to FIGS. 2 and 3, the image analyzer 110 may detect the teeth and the mouth included in the image using a detection algorithm for a contour, edge, or object as marked on the image of FIG. 3 (by solid and dotted lines) and may detect the teeth and the shape of the mouth based on the detection to determine the condition of the teeth.

For example, when the teeth included in the image received by the image analyzer 110 are unevenly arranged or include a damaged tooth, the image analyzer 110 may detects the teeth in the received image, and the image, and determine whether a region of interest (ROI) 310, which is an area including teeth necessary for manufacturing a 3D dental laminate, is present in the image.

Here, the ROI is an area that is absolutely necessary in the image to manufacture a dental laminate. It may be, for example, an area that includes uneven teeth or a damaged tooth, or an area that includes a plurality of teeth including two front teeth. Embodiments are not limited thereto, and the ROI may be any region including a certain number of teeth included in the image.

The ROI 310 may be determined by the image analyzer 110, but is not limited thereto. It may be set by a manager, operator, or user of the apparatus 100.

Also, the image analyzer 110 may determine whether the received image is suitable for 3D tooth modeling, based on the contour and area of teeth included in the ROI and the contour and area of the mouth.

For example, the image analyzer 110 may calculate the area of the mouth based on the area of the closed curve drawn by the contour of the mouth, and calculate the total area of the closed curve drawn by the contour of the teeth included in the ROI 310 to calculate the area of the teeth. Then, the image analyzer 110 may determine whether the received image is suitable for 3D tooth modeling, based on the ratio of the mouth area to the tooth area of the ROI 310.

In other words, an image captured while the user's mouth is wide open includes a region around the gums and the corners of the mouth, and thus the mouth area is calculated in the image. Accordingly, the calculated tooth area may be small compared to the mouth area. In an image captured while the user's mouth is not wide open, the proportion of the calculated tooth area to the mouth area may be large.

Accordingly, the image analyzer 110 may determine whether the image is captured while the user opens his or her mouth wide enough to secure the ROI, and may guide the user to capture a proper image for manufacturing of a 3D tooth model and/or a dental laminate, based on the determination factors.

In addition, the image analyzer 110 may analyze the tooth image included in the ROI 310 to determine whether a tooth model and/or a dental laminate to be manufactured corresponds to an upper tooth or a lower tooth. For example, when the upper width 301 of a tooth included in the ROI 310 is less than the lower width 302, the image analyzer 110 may determine that the tooth model and/or dental laminate to be manufactured corresponds to an upper tooth. On the other hand, when the upper width of the tooth included in the ROI is greater than the lower width, it may be determined that the tooth model and/or dental laminate to be manufactured corresponds to a lower tooth.

FIG. 4 is an exemplary view illustrating a measurement guide with a predetermined size control object.

Referring to FIG. 4, the image analyzer 110 may receive a captured image including a control object having a predetermined size, calculate an objective tooth size, and adjust the scale. To this end, the image analyzer 110 may provide the user terminal 10 with a measurement guide 410 capable of providing size comparison in measuring the image.

In an embodiment of FIG. 4, the measurement guide 410 uses a credit card, which is a control object having a predetermined size, to guide capturing a tooth image. However, embodiments are not limited thereto. The measurement guide 410 may be provided in the form of a guide allowing a control object having a predetermined size such as a credit card, a coin, a dollar bill, a business card, a sheet of A4 paper, a ruler, or a USB terminal to be photographed in capturing an image.

For example, referring to FIGS. 3 and 4, when a user captures an image through the user terminal 10, the image analyzer 110 may provide a measurement guide 410 to the user terminal 10 such that a control object having a predetermined size is placed at a position adjacent to the ROI 310 without covering the ROI 310.

In another example, the image analyzer 110 may check whether the control object is adjacent to the tooth positioned in the ROI 310 and is in the same plane as the tooth using another method in place of the measurement guide 410 in order to reduce measurement error. For example, the image analyzer 110 may check the contours of the control object using one of the above-described algorithms, and check whether upper and lower horizontal contour lines and/or left and right vertical contour lines are the same length or parallel to determine whether the control object is positioned in the same place as the tooth positioned in the ROI 310. Alternatively, the image analyzer 110 may check the contour of the tooth positioned in the ROI 310 and the contour of the control object and determine whether the tooth and the control object are adjacent to each other. However, embodiments are not necessarily limited to the above example. It will be appreciated by those skilled in the art that various applicable methods, including the measurement guide 410 or the algorithm described above, may be used to measure the absolute size of a tooth using a control object having a predetermined size.

FIGS. 5A to 5C are exemplary views illustrating an example of generating a 3D tooth modeling file and a dental laminate modeling file based a received tooth image.

Referring again to FIGS. 2 and 5A to 5C, the modeling unit 120 may generate a 3D tooth modeling file based on the received tooth image.

The modeling unit 120 may estimate a pose of a camera that has captured the received tooth image through a Structure from Motion (SfM) process. For example, the modeling unit 120 may estimate the pose of the camera for each image frame of each photo or video based on images including 2D and 3D photos or videos taken at various angles.

SfM is one of the techniques for reconstructing a 3D structure based on one or more 2D images (e.g., consecutively captured 2D images of the same object) in computer vision technology. SfM may infer a 3D structure based on motions or positional changes of features included in images captured by a camera moved around an object.

For example, the SfM algorithm may perform feature extraction, feature matching in a 2D image, and compute camera movements and a 3D structure of the object from multiple images using a bundle adjustment technique.

In addition, when SfM is used, the camera poses for respective images may be estimated as a sequence to reconstruct the 3D structure of the object. For example, the position (x, y, z coordinates) and rotation (pitch, yaw, roll, angle, etc.) of the camera may be estimated.

For example, the modeling unit 120 may estimate the pose of the camera through SfM, and track feature points across multiple images to triangulate the 3-dimension position of the feature points based on the relative movements among the poses of the camera for multiple photos to generate a 3D tooth modeling file and a 3D tooth modeling file based on sparse 3D points. Here, the feature point may be at least one object detected in the received image. The feature point may be, for example, an outline of an object included in each image, or a center point of an individual tooth, eye, nose, or mouth.

In this case, the modeling unit 120 may generate a high-density 3D model from 2D images using Multiview View Stereo (MVS). For example, after the pose of the camera estimated by SfM and 3D points are acquired, the surface normal and depth of each pixel in the image may be estimated using photometric stereo.

Here, the modeling unit 120 may generate a stereo pair by pairing multiple camera poses estimated in the SfM process. In this case, the modeling unit 120 may generate a depth map for each of the images corresponding to the stereo pair using deep learning based stereo depth map estimation.

For example, when it is assumed that there are P1 to Pk photos (e.g., k series photos) for which the camera pose is to be estimated through SfM, and that the P1 to Pk photos are taken in chronological order, the modeling unit 120 may create a stereo pair of picture Pn and Pn+1 taken in chronological order. The difference in camera pose (e.g., camera pose, angle, pitch, roll, yaw, position, etc.) between photos taken at close times among the series photos taken in chronological order may be found. Accordingly, the modeling unit 120 may generate a depth map by pairing multiple views implemented with multiple photos as a stereo view, thereby generating a more sophisticated 3D tooth modeling file.

In addition, the modeling unit 120 may apply an algorithm (e.g., Poisson surface reconstruction, view-dependent simplification, marching cube, etc.) for estimating a surface of an object based on the sparse 3D point cloud and the camera pose to create a dense 3D point cloud that covers the surface to create a 3D texture mesh of the object.

In other words, the modeling unit 120 may estimate the pose of the camera in the 2D image using SfM and generate a sparse 3D point cloud, and the MVS may create a 3D polygon mesh image by generating a dense 3D point cloud or a 3D texture mesh that covers the entire surface of the sparse 3D point cloud generated through SfM.

For example, the modeling unit 120 may analyze and scale up or down the received 2D or 3D image and video through a computer aided design (CAD) (e.g., AutoCAD, Exocad, and other dental CAD programs) to generate a 3D tooth modeling file.

FIG. 6 is an exemplary view illustrating an example of adjusting the scale of a generated 3-dimensional tooth modeling file.

The modeling unit 120 may adjust the tooth scale in the generated 3D tooth modeling file for the size of the actual tooth.

For example, since the predetermined size of a control object may be the same all over the world, the modeling unit 120 may compare the size of an actual tooth with the size of the tooth in the received image by comparing the actual size of the predetermined size control object with the size of the photographed predetermined size control object in the received image, and may adjust the scale of the actual size of the 3D tooth modeling file for the actual tooth size.

For example, referring to FIG. 6, although the width of the front teeth is 18.45 mm in a captured tooth image including the predetermined size control object, the actual width of the photographed teeth is 18.33 mm. Accordingly, the scale needs to be adjusted.

For example, the size of a credit card conforms to ISO/IEC 7810:2003 standards, and international standards for ID cards have four standards: ID-1, ID-2, ID-3, and ID-000. For example, ID-1 has a predetermined size of 85.60×53.98 mm (3.370×2.125 inch), and is used as a standard for most bank cards and a driver's license in Korea, the United States, Canada, Australia, and the European Union.

The modeling unit 120 may compare the size of a predetermined size control object (e.g., credit card) included in the received image with the actual size of a credit card, and adjust the tooth size in the received image according to the ratio corresponding to the difference in size. Thereby, the size of the teeth in the received image may be adjusted for the actual size even without directly measuring the actual size of the teeth.

For example, when the measured height of the credit card in the image is 54.33 mm, the modeling unit 120 may calculate the actual width of the teeth based on the height (54.33 mm) of the credit card in the image, the width (18.45 mm) of the teeth in the image, and the actual height of the credit card (53.98 mm)

$$\left(18.33\text{mm} = \frac{53.98}{54.33} \times 18.45\right).$$

FIG. 7 is an exemplary view illustrating a 3-dimensional tooth model and a 3-dimensional dental laminate.

The modeling unit 120 may model a 3D dental laminate based on the generated 3D tooth modeling file. The three-dimensional dental laminate may be attached so as to cover the teeth from the outside of the generated three-dimensional tooth model or the actual teeth of a user, thereby aesthetically making up for misaligned teeth or damaged teeth.

Referring to FIG. 7, the modeling unit 120 may model a 3D dental laminate such that the outer shape of a 3D tooth model 730 is formed in an intaglio on the inner side 720 of the 3D dental laminate, and the outer side 710 of the 3D dental laminate has a normal tooth shape and tooth alignment shape.

Here, the normal tooth shape and tooth alignment shape may mean a dental condition in which there is no damage to the teeth, the teeth are evenly arranged without malocclusion, and the upper teeth slightly cover the lower teeth and protrude forward. It may mean a dental condition that does not require dental treatment in terms of aesthetics.

Referring back to FIG. 7, the outer side of the 3D tooth model 730 is matched with the inner side 720 of the 3D dental laminate (740, 750). Thus, the 3D dental laminate is coupled to cover the outer side of the 3D tooth model.

Facial veneers, which are formed of a thin layer of a material applied to the front surface of teeth, usually ceramics or composite resin, to improve the appearance of teeth, are used to correct cosmetic dental issues such as tooth discoloration, gaps, and tooth misalignment. Facial veneers are known as a popular cosmetic dentistry option because they may provide a natural, long-lasting solution.

However, multiple facial veneers are composed of one veneer per tooth, and are thus may be lost, and inefficient in terms of durability and economic feasibility. On the other hand, in the case of the alternative 3D tooth model according to the present disclosure, a plurality of individual tooth may be connected to each other and modeled as one piece. Accordingly, multiple teeth (e.g., 2 to 10 teeth) may be evenly arranged, and the piece may be easily attached and detached and are less likely to be lost.

In addition, when the modeling unit 120 generates a 3D dental laminate modeling file, user information may be embossed or engraved on one side of the interior or exterior of the 3D dental laminate. For example, the modeling unit 120 may generate a 3D dental laminate modeling file such that the user's name or gender or a phrase designated by the user is imprinted on the 3D dental laminate.

Accordingly, the dental laminate of a predetermined user may be distinguished from among a plurality of 3D dental laminates.

FIG. 8 is an exemplary diagram illustrating an example in which a manufacturing server manufactures a 3-dimensional tooth model and/or a 3-dimensional dental laminate.

Referring to FIG. 8, the server 200 may manufacture a 3D tooth model and/or a 3D dental laminate using a 3D printer 300 (e.g., Carbon 3D Printer by Google or Asiga 3D Printer) connected over a wired/wireless network. However, embodiments are not limited thereto. The server 200 may be a component included in the apparatus 100. In this case, the apparatus 100 may be directly connected to the 3D printer 300 over a wired or wireless network to manufacture a tooth model.

As an example, the 3D printer 300 may manufacture a 3D tooth model and/or a 3D dental laminate using Lucitone (Dentsply Sirona, USA). In addition to the above example, it will be appreciated by those skilled in the art that any material that is sturdy and has some flexibility as to be used for manufacturing a 3D tooth model and/or a 3D dental laminate may be used as a driving material for the 3D printer 300.

After the 3D tooth model and/or the 3D dental laminate are printed by the 3D printer 300, the server 200 may wash the printed tooth model and/or dental laminate through a washing machine. Then, the server 200 may cure the washed tooth model and/or dental laminate. The curing may be performed using a method such as UV curing, thermal curing, or painting surface coating. Then, the server 200 may finally finish washing the tooth model and/or dental laminate by performing ultrasonic cleaning in running water and ethanol.

FIG. 9 is an exemplary flowchart illustrating a method for manufacturing a 3D dental laminate by a 3D dental laminate manufacturing system.

Referring to FIGS. 1, 2 and 9, the apparatus 100 may receive an image including the user's teeth from the user terminal 10 (S910). Here, the image may include a 2D image, a 3D image, and a video.

Upon receiving a captured image including a predetermined size control object, the apparatus 100 may calculate a tooth size and adjust the scale. To this end, the apparatus 100 may provide the user terminal 10 with a measurement guide for providing size comparison in performing a measurement in a photo.

Then, after receiving the image, the apparatus 100 may analyze the received image and adjust the scale to generate a 3D tooth modeling file and store the same in a database.

For example, the apparatus 100 may analyze and scale up or down the received 2D or 3D image and video through a computer aided design (CAD) (e.g., AutoCAD, Exocad, and other dental CAD programs) to generate a 3D tooth modeling file and/or a dental laminate modeling file for manufacturing a tooth model and/or a dental laminate.

For example, the apparatus 100 may estimate the pose of the camera through SfM (S920), and track feature points across multiple images to triangulate the 3-dimension position of the feature points based on the relative movements among the poses of the camera for multiple photos to compute sparse 3D points (S930, S940).

In addition, the apparatus 100 may estimate the pose of the camera in the 2D image using SfM and generate a sparse 3D point cloud, and the MVS may create a 3D image by generating a dense 3D point cloud or a 3D texture mesh that covers the entire surface of the sparse 3D point cloud generated through SfM.

The apparatus 100 may generate a 3D tooth modeling file based on the 3D image generated in this way (S950).

Next, the apparatus 100 may adjust the tooth scale of the generated 3D tooth modeling file for the size of the actual tooth (S960).

For example, since the predetermined size of a control object may be the same all over the world, the apparatus 100 may compare the size of an actual tooth with the size of the tooth in the received image by comparing the actual size of the predetermined size control object with the size of the photographed predetermined size control object in the received image, and may adjust the scale of the actual size of the 3D tooth modeling file to make the tooth size in the received image for the actual tooth size.

After the 3D tooth modeling file scaled for the actual tooth size is generated, the apparatus 100 may generate a 3D dental laminate modeling file based on the generated 3D tooth modeling file, and transmit the 3D tooth modeling file and/or the 3D dental laminate modeling file to the server 200 to manufacture a 3D tooth model and/or a 3D dental laminate (S970).

The server 200 may manufacture a 3D tooth model and/or a 3D dental laminate using a 3D printer 300 (e.g., Carbon 3D Printer by Google and Asiga 3D Printer) connected thereto over a wired/wireless network (S980). As described above, it can be understood that the server 200 may be a component included in the apparatus 100.

As an example, the 3D printer 300 may manufacture a 3D tooth model and/or a 3D dental laminate using a material such as Lucitone (Dentsply Sirona, USA). This material is sturdy and has some flexibility, and is thus advantageous for manufacturing a 3D tooth model and/or a 3D dental laminate.

FIG. 10 is a diagram illustrating a hardware configuration of the apparatus according to FIG. 2.

Referring to FIG. 10, the apparatus 100 may include at least one processor and a memory configured to store instructions instructing the at least one processor to perform at least one step. Although not shown in FIG. 10, the server 200 may be a component included in the apparatus 100 or components of the apparatus 100 may be physically included in the user terminal 10.

The at least one step may include a function or step performed by the components 110 to 120 of the apparatus 100, the user terminal 10 or the server 200 described above, or other functions or operation methods.

Here, the at least one processor may represent a central processing unit (CPU), a graphics processing unit (GPU), or a dedicated processor configured to carry out methods according to embodiments of the present disclosure. Each of the memory 1020 and the storage device 1060 may include at least one of a volatile storage medium and a non-volatile storage medium.

For example, the memory 1020 may be one of a read only memory (ROM) and a random access memory (RAM), and the storage device 1060 may be a flash-memory, a hard disk drive (HDD), a solid state drive (SSD), or various memory cards (e.g., a micro SD card).

In addition, the apparatus 100 may include a transceiver 1030 configured to perform communication over a wireless network. In addition, the apparatus 100 may further include an input interface device 1040, an output interface device 1050, a storage device 1060, and the like. The components included in the apparatus 100 may be connected by a bus 1070 to communicate with each other.

For example, the apparatus 100 may include a desktop computer, a laptop computer, a notebook, a smart phone, a tablet PC, a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, and a personal digital assistant (PDA).

The embodiments described above may be implemented by hardware components, software components, and/or a combination of hardware components and software components. For example, the apparatus, method, and components described in the embodiments may be implemented using one or more general purpose or special purpose computers such as, for example, a processor, a controller, an arithmetic logic unit (ALU), a digital signal processor, a microcomputer, a field programmable gate array (FPGA), a programmable logic unit (PLU), microprocessors, or any other device capable of executing and responding to instructions.

A processing unit may run an operating system (OS) and one or more software applications executed on the OS. The processing unit may also access, store, manipulate, process, and generate data in response to execution of software. While it is described for convenience of understanding that one processing unit is used, those skilled in the art will understand that the processing unit may include a plurality of processing elements and/or a plurality of types of processing elements. For example, the processing unit may include a plurality of processors or one processor and a controller. Other processing configurations such as parallel processors are also possible.

Software may include a computer program, code, instructions, or a combination of one or more of the foregoing, and may configure a processing unit to operate as desired or independently or collectively instruct the processing unit. Software and/or data may be permanently or temporarily embodied in any type of machine, component, physical device, virtual equipment, computer storage medium or device, or a transmitted signal wave in order to be interpreted by or provide instructions or data to a processing unit. Software may be distributed on networked computer systems and may be stored or executed in a distributed manner. The software and data may be stored on one or more computer-readable media.

The method according to the embodiment may be implemented in the form of program instructions that may be executed through various computer means and recorded on a computer-readable medium. The computer-readable medium may include program instructions, data files, and data structures alone or in combination. The program instructions recorded on the medium may be specially designed and configured for the embodiments or may be known and available to those skilled in computer software. Examples of the computer-readable recording media include magnetic media such as hard disks, floppy disks and magnetic tapes, optical media such as CD-ROMs and DVDs, magnetio-optical media such as floptical disks, and hardware devices specially configured to store and execute program instructions, such as ROM, RAM, and flash memory. Examples of program instructions include high-level language codes that may be executed by a computer using an interpreter, as well as machine language codes such as those produced by a compiler. The hardware devices described above may be configured to operate as one or more software modules to perform the operations of the embodiments, and vice versa.

As disclosed above, the embodiments have been described by limited drawings. However, those skilled in the art may apply various technical modifications and variations based on the above. For example, the described techniques may be carried out in an order different from the method described, and/or components of the described system, structure, apparatus, circuit, and the like may be coupled or combined in a different form than the method described, or replaced or substituted by other components or equivalents that may achieve appropriate results.

Therefore, other implementations, other embodiments, and equivalents of the claims are within the scope of the accompanying claims.

What is claimed is:

1. A system for manufacturing a three-dimensional dental laminate, the system comprising:
   at least one processor; and
   a memory operably coupled to the at least one processor, wherein the memory stores instructions that cause the at least one processor to perform at least one operation in response to execution of the instructions by the at least one processor,
   wherein the at least one operation comprises:
   receiving images including a user's teeth;
   estimating poses of a camera by analyzing the received images;
   computing sparse 3D points by tracking feature points in the received images and triangulating a three-dimensional position of the feature points based on relative movements among the estimated poses of the camera;
   generating a three-dimensional tooth modeling file based on the sparse 3D points and adjusting a tooth size of the generated three-dimensional tooth modeling file for a size of an actual tooth;
   generating a three-dimensional dental laminate modeling file based on the three-dimensional tooth modeling file adjusted for the actual tooth; and
   manufacturing a three-dimensional dental laminate based on the generated three-dimensional dental laminate modeling file.

2. The system of claim 1, wherein the at least one operation further comprises:
   detecting a condition of the teeth by detecting the teeth and a mouth shape included in the received images using an object detection algorithm.

3. The system of claim 2, wherein the at least one operation further comprises:
   determining whether a region of interest including a tooth necessary for manufacturing a three-dimensional dental laminate is present in the received images; and
   determining whether the received images are suitable for three-dimensional tooth modeling based on a contour and area of the tooth included in the region of interest and a contour and area of the mouth shape.

4. The system of claim 3, wherein the at least one operation further comprises:
   when an upper width of the tooth included in the region of interest is less than a lower width thereof, determining that the tooth to be modeled is an upper tooth; and
   when the upper width of the tooth included in the region of interest is greater than the lower width, determining that the tooth to be modeled is a lower tooth.

5. The system of claim 1, wherein the estimating of the poses of the camera comprises:
   estimating the poses of the camera capturing the received images through a Structure from Motion (SfM) process,
   wherein the generating of the three-dimensional tooth modeling file comprises:
   generating a stereo pair by pairing the poses of the camera estimated through the SfM process; and
   generating a depth map for each of the images corresponding to the stereo pair using deep learning-based stereo depth map estimation.

6. The system of claim 1, wherein the images further include a predetermined size control object, wherein the adjusting of the tooth size of the generated three-dimensional tooth modeling file for the size of the actual tooth comprises:
   comparing an actual size of the predetermined size control object with the size of the predetermined size control object included in the images and adjusting an actual size of the three-dimensional tooth modeling file.

7. The system of claim 1, wherein the generating of the three-dimensional dental laminate modeling file comprises:
   generating the three-dimensional dental laminate modeling file such that an outer shape of the three-dimensional tooth modeling file adjusted for the size of the actual tooth is formed on an inner side in intaglio, and an outer side has a normal tooth shape and tooth alignment shape.

8. The system of claim 7, wherein the three-dimensional dental laminate modeling file comprises a one piece model structure connecting all individual tooth.

9. The system of claim 7, wherein the three-dimensional dental laminate modeling file is modeled in a form of embossed or engraved user information on one side of an interior or exterior of the three-dimensional dental laminate.

10. A method for manufacturing a three-dimensional dental laminate by a system, the method comprising:
    receiving images including a user's teeth;
    estimating poses of a camera by analyzing the received images;
    computing sparse 3D points by tracking feature points in the received images and triangulating a three-dimensional position of the feature points based on relative movements among the estimated poses of the camera;
    generating a three-dimensional tooth modeling file based on the sparse 3D points;
    adjusting a tooth size of the generated three-dimensional tooth modeling file for the size of an actual tooth;
    generating a three-dimensional dental laminate modeling file based on the three-dimensional tooth modeling file adjusted to have the same size as the actual tooth; and
    manufacturing a three-dimensional dental laminate based on the generated three-dimensional dental laminate modeling file.

11. The method of claim 10, further comprising:
    detecting a condition of the teeth by detecting the teeth and a mouth shape included in the received images using an object detection algorithm.

12. The method of claim 11, further comprising:
    determining whether a region of interest including a tooth necessary for manufacturing a three-dimensional dental laminate is present in the received images; and
    determining whether the received images are suitable for three-dimensional tooth modeling based on a contour and area of the tooth included in the region of interest and a contour and area of the mouth shape.

13. The method of claim 12, further comprising:
    when an upper width of the tooth included in the region of interest is less than a lower width thereof, determining that the tooth to be modeled is an upper tooth; and
    when the upper width of the tooth included in the region of interest is greater than the lower width, determining that the tooth to be modeled is a lower tooth.

14. The method of claim 10, wherein the estimating of the poses of the camera comprises:
    estimating the poses of the camera capturing the received images through a Structure from Motion (SfM) process, wherein the generating of the three-dimensional tooth modeling file comprises:

generating a stereo pair by pairing the poses of the camera estimated through the SfM process; and generating a depth map for each of the images corresponding to the stereo pair using deep learning-based stereo depth map estimation.

15. The method of claim 10, wherein the images further include a predetermined size control object, wherein the adjusting of the tooth size of the generated three-dimensional tooth modeling file for the size of the actual tooth comprises:

comparing an actual size of the predetermined size control object with a size of the predetermined size control object included in the images and adjusting an actual size of the three-dimensional tooth modeling file.

16. The method of claim 10, wherein the manufacturing of the three-dimensional dental laminate comprises:

transmitting the generated three-dimensional dental laminate modeling file to a manufacturing server; and outputting the three-dimensional dental laminate using a 3D printer connected to the manufacturing server over a wired or wireless network.

17. The method of claim 10, wherein the generating of the three-dimensional dental laminate modeling file comprises:

generating the three-dimensional dental laminate modeling file such that an outer shape of the three-dimensional tooth modeling file adjusted for the size of the actual tooth is formed on an inner side in intaglio, and an outer side has a normal tooth shape and tooth alignment shape.

18. The method of claim 17, wherein the generating of the three-dimensional dental laminate modeling file comprises a one piece model structure connecting all individual tooth.

19. The method of claim 17, wherein the generating of the three-dimensional dental laminate modeling file comprises:

modeling in a form of embossed or engraved user information on one side of an interior or exterior of the three-dimensional dental laminate.

20. A computer-readable recording medium storing a computer program for executing the method of claim 10 when executed by a system including at least one processor.

* * * * *